United States Patent [19]
Backe et al.

[11] Patent Number: 4,752,867
[45] Date of Patent: Jun. 21, 1988

[54] CONTROL CIRCUITRY FOR ELECTRIC DRIVES

[75] Inventors: Bengt S. Backe, Dundee; Lamoyne W. Durham, Bartlet, both of Ill.

[73] Assignee: South Bend Lathe, Inc., South Bend, Ind.

[21] Appl. No.: 772,458

[22] Filed: Sep. 4, 1985

Related U.S. Application Data

[63] Continuation-in-part of Ser. No. 647,158, Sep. 4, 1984, Pat. No. 4,706,456.

[51] Int. Cl.⁴ .................... G06F 15/46; G05B 19/417
[52] U.S. Cl. ................................. 364/132; 364/200; 364/474
[58] Field of Search .................. 364/131–134, 364/167–171, 474, 475, 200; 318/685, 696, 570, 573

[56] References Cited

U.S. PATENT DOCUMENTS

| | | | |
|---|---|---|---|
| 3,882,304 | 5/1975 | Walters | 364/169 |
| 4,079,235 | 3/1978 | Froyd et al. | 364/132 |
| 4,109,185 | 8/1978 | Froyd et al. | 318/571 |
| 4,118,871 | 10/1978 | Kirkham | 364/560 X |
| 4,149,235 | 4/1979 | Froyd et al. | 364/132 |
| 4,251,858 | 2/1981 | Cambigue et al. | 364/132 |
| 4,262,336 | 4/1981 | Pritchard | 364/474 |
| 4,281,379 | 7/1981 | Austin | 364/474 X |
| 4,456,951 | 6/1984 | Hennenberger et al. | 364/167 X |
| 4,472,783 | 9/1984 | Johnstone et al. | 364/132 X |
| 4,514,814 | 4/1985 | Evans | 364/474 |

*Primary Examiner*—Joseph Ruggiero
*Attorney, Agent, or Firm*—Barnes & Thornburg

[57] ABSTRACT

A control system is provided for a hydraulic actuating system having a multi-phase stepping motor with a driver therefor which supplies and controls DC current through each of the motor windings such that no current is induced into the control winding from adjacent windings. The stepping motor precisely controls the rotation of an eccentric cam engaging an actuating plunger which actuates a control valve of the hydraulic actuating system. The driver receives control signals from a computer programmed to calculate, from user input command signals indicative of the desired system condition, and generate those control signals which most quickly achieve a rough approximation of the desired system condition. After this rough approximation is attained, the computer generates new control signals for the driver as a function of feedback signals and/or system component characteristics so as to precisely achieve the desired system condition. In a preferred embodiment, the computer comprises a master processor and a plurality of identical slave processors which are selectively addressed to control respective machine functions.

12 Claims, 4 Drawing Sheets

CONTROL CIRCUITRY FOR ELECTRIC DRIVES

BACKGROUND AND SUMMARY OF THE INVENTION

This application is a continuation in part of U.S. application Ser. No. 647,158 filed on Sept. 4, 1984, now U.S. Pat. No. 4,706,456, entitled "Method and Apparatus for Controlling Hydraulic Systems." To the extent necessary to aid those skilled in the art in understanding the present application, the complete disclosure of that application is hereby incorporated into the present disclosure by specific reference thereto.

The present invention relates generally to control systems for hydraulic devices and, more particularly, to such control systems for use in machine tools.

Machine tools typically require a workpiece or tool element to be positionable or movable linearly and/or rotatably during the course of machining. This positioning or movement is often controlled hydraulically. For example, hydraulically actuated pistons may be employed adjacent the sides of the main slides of lathes to provide linear motion between the head and tail ends of the bed. Four-way valves typically control the flow of hydraulic fluid to and from these pistons. Previously, electrohydraulic servo valves have been used to actuate the four-way valves.

Unfortunately, electrohydraulic servo valves are comparatively expensive and do not provide sufficiently reliable and accurate control over the valve position. Such control is desirable to achieve greater machining precision. It has often been very difficult to accurately control the null position of the four-way valve such that no fluid flow is permitted to or from hydraulic control lines, especially under changing working conditions such as increasing temperature. It has also been difficult to precisely determine the rate of fluid flow in the hydraulic control lines for a given four-way valve setting with such servo valves. At least in part, this is due to component hystereses. Sources of these hystereses include friction and inertia between moving parts. For example, friction and inertia not only retard movement of the four-way valve spool within the valve housing, but also prevent it entirely below a given level of applied motive force. Also, overlap of the outer surface of the four-way valve spool over flow ports results in a wide null region or deadband wherein the application of motive force sufficient to cause the valve to move still does not result in fluid flow-through the valve. Another disadvantage of these servo valves is it has often been necessary to provide separate control systems for linear and rotary motive systems, thus increasing machine costs and efficiency losses even more.

Stepping motors have been previously employed to control movement and positioning generally. A conventional way to drive stepping motors is by using resistors to limit the current going to the different motor windings. However, this driver method produces operating inefficiencies from the wasted power and heat build-up in the resistors used to limit stepping motor winding currents. Also, such drivers provide only full or half step resolution on particular stepping motors.

Another prior method of driving stepping motors employs a "chopper" driver which detects the current level going through the winding and limits it by shutting off the current completely when a predetermined upper limit is attained. When the current level then decays to a predetermined lower limit, the chopper driver turns the current flow on again. Thus, the current for each winding of a stepping motor is continuously turned off and on again to produce an average current over time which is within the ratings of the stepping motor. The chopper driver permits modulation or control of the amount of current going through each winding by adjustment of the levels at which the current is turned off and on. Chopper drivers are typically used in micro-stepping operating systems wherein the position of the stepping motor is controlled between its natural or inherent poles. However, chopper driver systems have been found to be impractical where extremely fine resolution is required. This results since, when the current requirement approaches zero in a particular control winding, significant induced currents arise in that winding from adjacent windings having a high current running therethrough. Thus, within practical limits, it is thus nearly impossible to achieve zero current in a particular control winding. This means that the angularity of the stepping motor cannot be precisely established and, if the stepping motor was used to actuate a valve, precise control of the valve openings and the flow rate therethrough cannot be attained. Where chopper driven stepping motors are employed with machine tools specifically, further imprecision may result because the continuous turning on and off of the current produces a continuously variable torque.

Various modern hydrostatic transmission systems also require increasingly greater precision in their control systems. For example, a variable displacement pump (VDP) may be employed to drive a fluid motor providing spindle rotation. Control for the VDP has been provided by a closed-loop analogue system where analogue command signals are input to a controller which displaces a hydraulic actuator that acts through a valve system to displace the VDP swash plate. Analogue feedback signals are provided off the fluid motor and are input to the controller. The controller makes a comparison between the command signals and the feedback signals to generate error signals to alter the swash plate displacement. These error signals gradually decrease along a continuous curve as the actual swash plate position approaches the desired position. Several problems, largely a result of VDP and fluid motor idiosyncrasies, have been found where extremely precise control of these transmission systems is desired.

There are several characteristics of individual VDPs that make control with simple closed-loop analogue systems very difficult. For example, there is often a considerable amount of deadband and hystereses in the swash plate operation itself. In other words, an increase of the command signal does not cause immediate swash plate displacement. Also, the command signal must exceed a given level before any swash plate movement results. With analogue systems, this can easily result in imprecisions and instabilities. At some point, the error signal will not be sufficient to cause swash plate displacement. Thus, optimum VDP output will never be obtained. Further, the lag time in swash plate response to command signals typically results in excessive overshooting and undershooting. This unresponsiveness and control inaccuracy is exacerbated when the transmission system must be operated at a fixed speed under varying load conditions. Increasing the gain of the near zero error signal to compensate for the hystereses often does not achieve greater accuracy. Instead, because of the swash plate response lag time, the swash plate displacement oscillates about the desired position for an extended period of time.

Another problem encountered in prior hydrostatic transmission systems is when abrupt and large speed changes are necessary. It is often desirable to go from a low speed to a high speed or from one direction to another instantaneously or at least to accelerate in the shortest possible time. Where analogue loop command systems have been employed, the initial swash plate displacement is relatively fast because the error between the command and feedback signal is quite large. However, as the optimum level is approached along a continuous error signal curve, the error becomes less and less and will eventually cease to be sufficient to drive the swash plate such that the optimum is not attained. Inputting a larger command signal may cause the optimum swash plate displacement to be exceeded, but then the same hystereses problem results when the swash plate position is backed down to the optimum level.

It is therefore an object of the present invention to provide an improved motive control system having increased precision and responsiveness.

Another object is the provision of an improved hydraulic control system for accurately actuating valve elements and control flow therethrough.

A further object is to provide a control system for hydraulic actuating systems which compensates for various system component characteristics as well as operating conditions.

Yet another object is the provision of a control system for machine tools having increased response speed toward achieving desired changes in movable element orientation.

These and other objects of the present invention are provided in a control system for a hydraulic actuating system having a multi-phase stepping motor with a driver therefore which supplies and controls DC current through each of the motor windings such that no current is induced into the control winding from adjacent windings. The stepping motor precisely controls the rotation of an eccentric cam engaging an actuating plunger which actuates a control valve of the hydraulic actuating system. The driver receives control signals from a computer programmed to calculate, from user input command signals indicative of the desired system condition, and generate those control signals which most quickly achieve a rough approximation is attained, the computer generates new control signals for the driver as a function of feedback signals and/or system component characteristics so as to precisely achieve the desired system condition.

The control system of the present invention has been found to be particularly suitable for use in numerical control of machine tools, such as lathes; having stepping motors for controlling workpiece or cutting tool motion. Control programming of the computer permits extensive customization without loss of precision.

Further objects, features, and advantages of the present invention will become more apparent from the following description when taken with the accompanying drawings which show, for purposes of illustration only, several embodiments in accordance with the present invention.

DETAILED DESCRIPTION OF THE DRAWINGS

Figure 1:
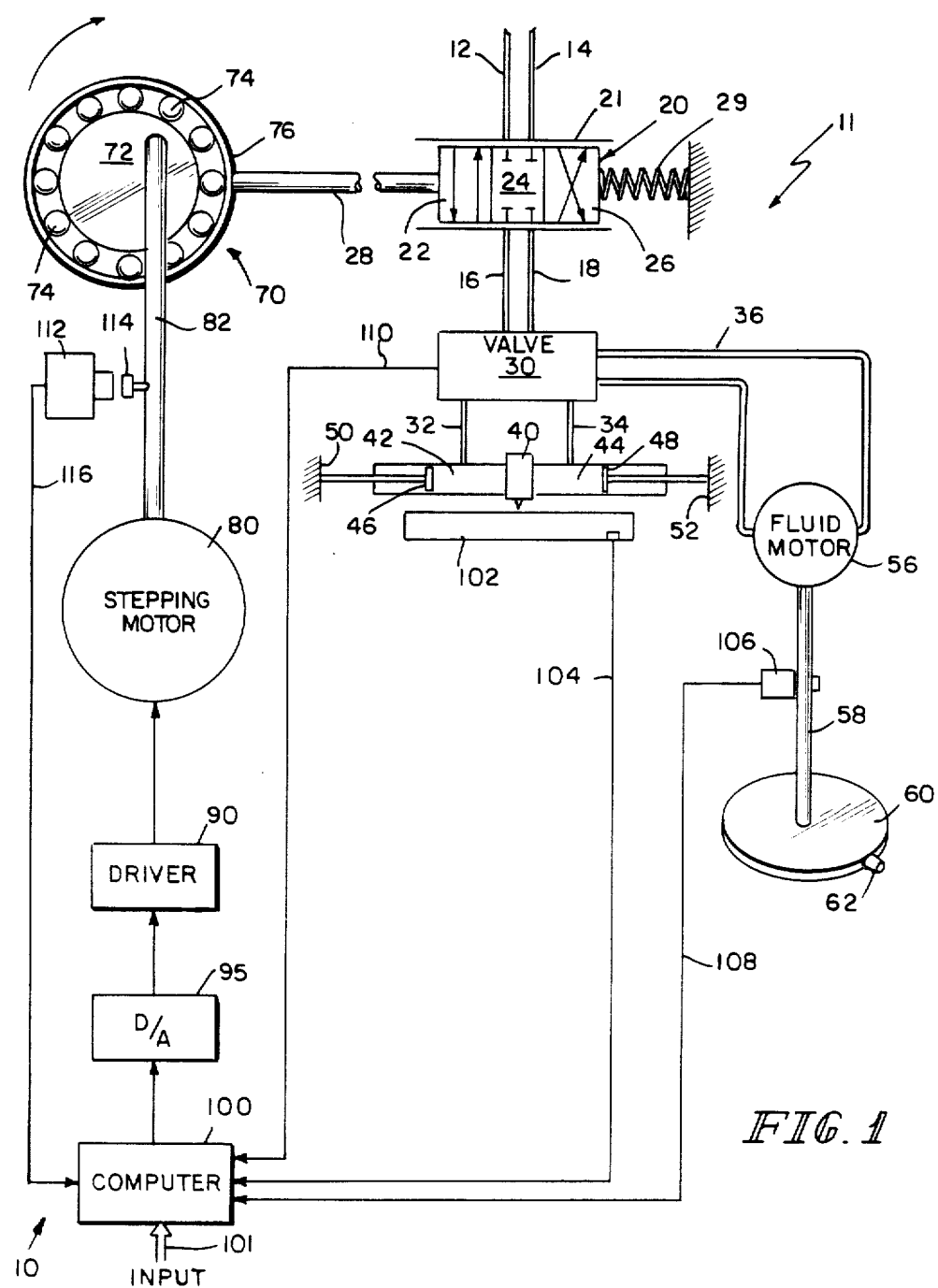
FIG. 1 shows, in block diagram and schematic form, a control system and hydraulic actuating system embodying the principles of the present invention.

FIG. 1, which illustrates a preferred embodiment of the present invention, shows a control system 10 for a hydraulic actuating system 11 suitable for supplying motive force to movable elements of, for example, a machine tool. In particular, control system 10 provides precise control of the position and/or velocity of linearly slidable or rotatable machine elements, such as work supports or cutting tools.

In the portion of hydraulic actuating system 11 shown in FIG. 1, hydraulic fluid and pressure is provided along supply line 12 to four-way spool valve 20, slidable within bore 21 of the valve housing (not shown). Hydraulic pressure and fluid drain is in communication with four-way valve 20 along return line 14. Hydraulic control lines 16 and 18 are also in communication with four-way valve 20 so as to receive hydraulic fluid from and supply such fluid to supply line 12 and return line 14, respectively.

Four-way valve 20 controls the amount and direction of the flow of hydraulic fluid between lines 12, 14, 16 and 18. Valve 20 includes three distinct actuating positions, 22, 24, and 26. In position 22, supply line 12 is in communication with control line 16 and control line 18 is in communication with return line 14. Position 24 is the null or shut off position where neither supply line 12 or return line 14 is in communication with either control line 16 or control line 18. In position 26, supply line 12 is in communication with control line 18 and control line 16 is in communication with return line 14. When valve 20 is between these positions the amount of hydraulic flow is generally proportional to the extent of its displacement toward a particular position.

Control lines 16 and 18 are connected to flow splitting valve 30 which alternatively applies the hydraulic fluid from control lines 16 and 18 to control lines 32 and 34 or 36 and 38, respectively. Valve 30 may, for example, be actuated by electrical switching solenoids. This arrangement has been found to be especially desirable where the hydraulic actuating system controls a plurality of movable elements which are not actuated simultaneously.

Control lines 32 and 34 supply hydraulic pressure to actuating piston cylinders 42 and 44, respectively, secured on opposite sides of, for example, machine tool workpiece slide 40. The hydraulic pressure differential between fluid in cylinder 42 and 44 against pistons 46 and 48, respectively, causes slide 40 to move linearly between end walls 50 and 52 bracing pistons 46 and 48, respectively. For example, when valve 20 is in position 22, and valve 30 is switching fluid to control lines 32 and 34, supply line 12 provides hydraulic pressure through control line 16 and 32 to cylinder 42 while return line 14 provides hydraulic pressure relief from cylinder 44 through control lines 34 and 18. As a result, the hydraulic pressure in cylinder 42 exceeds that in cylinder 44, and slide 40 moves to the right toward end wall 52. When valve 20 is in null position 24, flow of hydraulic fluid from supply line 12 and to return line 14 is shut off. Thus, the hydraulic pressure in cylinders 42 and 44 will be equalized, and slide 40 will remain stationary. When valve 20 is in position 26, supply line 12 provides hydraulic pressure through control lines 18 and 34 to cylinder 44 while return line 14 provides hydraulic pressure relief from cylinder 42 through control lines 32 and 16. As a result, the hydraulic pressure in cylinder 44 exceeds that in cylinder 42, and slide 40 moves to the left toward end wall 50.

A particular advantage of this piston/cylinder arrangement for actuating slide 40 is in that it enables the actuating force in cylinders 42 and 44 to be balanced more readily than in prior hydraulic slide actuators. This results, at least in part, because the surface area of pistons 46 and 48 exposed to hydraulic pressure may be made equal and because the flow of hydraulic pressure exerting the slide actuating force is always away from slide 40. Although only one piston/cylinder arrangement is illustrated on either side of slide 40, the present invention specifically contemplates the use of a plurality of such piston/cylinder arrangements on either side of slide 40.

When valve 30 is switching fluid to control lines 36 and 38, typically, no hydraulic fluid flows through control lines 32 and 34 to or from control lines 16 and 18, respectively. Control lines 36 and 38 are connected to fluid motor 56 having rotatable output shaft 58. This shaft is, for example, connected to machine tool turret 60 having tool 62 secured thereto. Differential hydraulic pressure between control lines 36 and 38 results in rotation of shaft 58 and, thus tool 62 of turret 60.

Valve 20 is actuated between positions 22, 24, and 26 by plunger 28 and is biased against plunger 28 by spring 29. Eccentric cam 70 includes inner eccentric disk 72 supported by ball bearings 74 mounted within ball bearing race 76. Plunger 28 abuts the outer surface of ball bearing race 76 of eccentric cam 70 and is pushed against valve 20 as cam 70 rotates. The amount of hydraulic flow through valve 20 is, thus, generally proportional to the displacement of plunger 28.

The functional orientation of cam 70 with respect to valve 20 is such that as cam 70 rotates to move the outer surface of ball bearing race 76 away from plunger 28 (clockwise in FIG. 1), valve 20 moves to the left toward position 26. Likewise, as cam 70 rotates to move the outer surface of race 76 toward plunger 28 (counterclockwise in FIG. 1), valve 20 moves against the bias of spring 29 to the right toward position 22. In this way, cam 70 controls the amount, speed, and direction of the displacement of plunger 28.

Cam 70 is connected to output shaft 82 of multi-phase electric stepping motor 80 along, for example, the rotational axis of cam 70. A suitable commercially available stepping motor is, for example, made by Berger-Lahr as part number RDM 566/50 S.S. 075A. Rotation of shaft 82 and resolution of stepping motor 80 is precisely controlled by driver 90 (described in detail below with regard to FIG. 2). Driver 90 receives control signals through digital-to-analogue converter (D/A) 95 of micro computer or microprocessor unit 100. This computer receives command signals from the user along input 101 indicative of the desired position and/or velocity of slide 40 and/or tool 62. Computer 100 generates digital control signals which are converted into analogue form by D/A 95 and into appropriate current input into appropriate windings of stepping motor 80.

In particular embodiments of the present invention it has been found advantageous to employ several micro computer systems in series or to split the computer function into separate levels. A first complete system or level would contain the user program and directly receive the command signals. The second computer system or level would receive the interpreted command signals from the first computer system or level, calculate the current in the stepper motor windings and modulation thereof necessary to actuate valve 20 to implement the command signals, and produce the appropriate output control signal for D/A 95 and driver 90. Thus, the control signals of computer 100 would, for example, follow a discontinuous curve in driving the actual system condition to the desired system condition represented in the command signals.

In the embodiment shown in FIG. 1, glass scale 102 monitors the linear position and/or velocity of slide 40 and provides feedback signals to computer 100 along line 104. A suitable commercially available glass scale is, for example, the Bausch and Lomb "mini-scale", part number 380706 or 889720. Also, encoder 106 indirectly monitors the angular position and/or velocity of tool 62 through rotation of shaft 58 and provides feedback signals to computer 100 along line 108. A suitable commercially available encoder is, for example, made by Litton Encoder Division of Litton Industries as model 70-E/M. These feedback signals enable computer 100 to generate error signals calculated from the difference between the desired and actual status of the movable machine tool elements, as described hereinbelow.

It has been found to be advantageous to provide feedback signals along line 110 from valve 30 to computer 100 to indicate whether valve 30 is switching hydraulic pressure to slide 40 or tool 62.

Further, optical detector 112 is provided to detect the position of vane 114 which is secured to shaft 82. Vane 114 is positioned on shaft 82 and aligned through cam 70 with respect to valve 20 such that, when valve 20 is precisely in null position 24, vane 114 is at a specific known location detectable by optical detector 112. Feedback signals indicative of this precise null position are provided by optical detector 112 to computer 100 along line 116. Such feedback signals are particularly advantageous where it is desired to provide control signals to stepping motor 80 to zero out and compensate for power-up surges.

Figure 2:
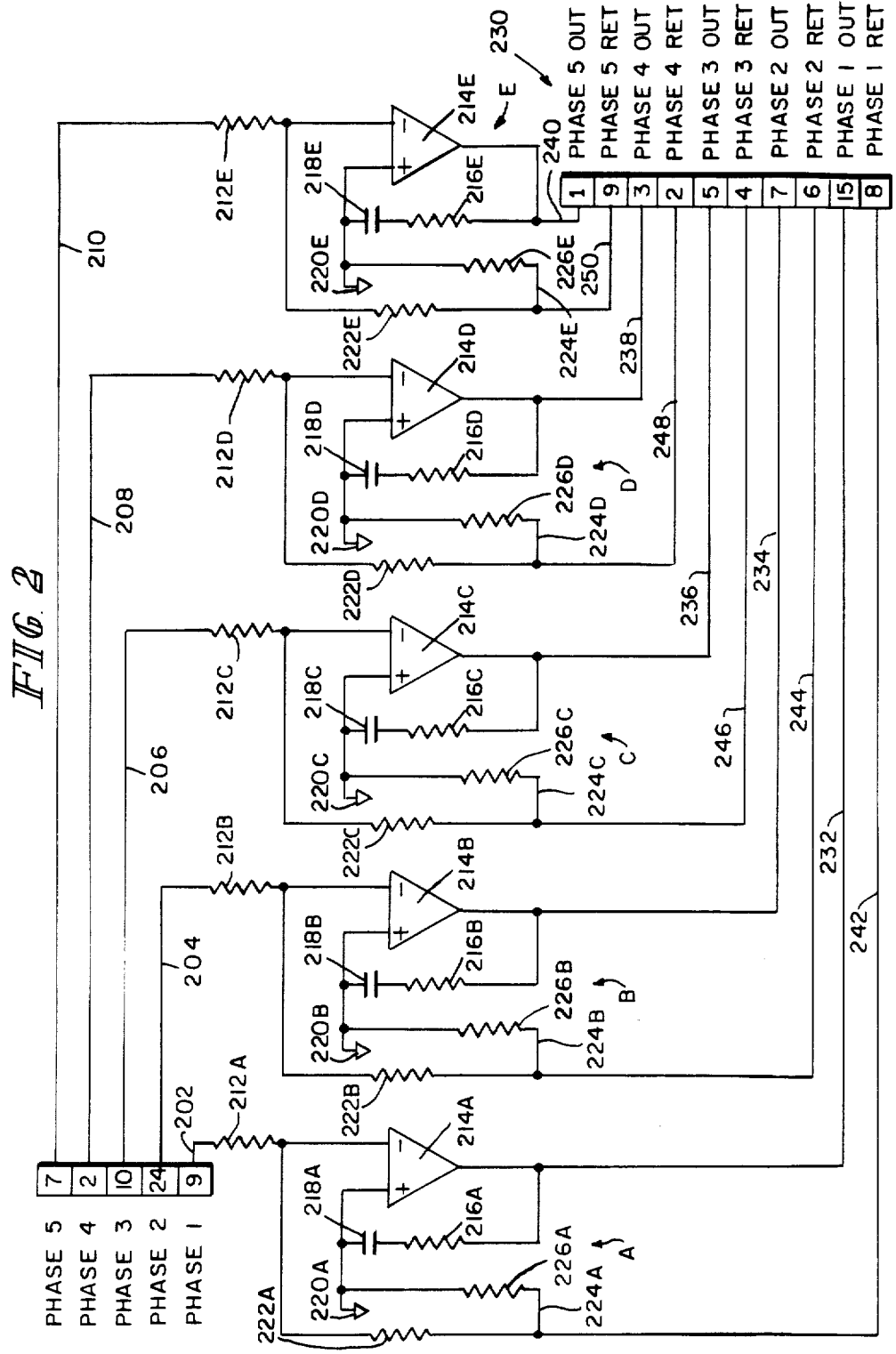
FIG. 2 shows schematically the circuit diagram for the stepping motor driver of FIG. 1, according to the principles of the present invention.

FIG. 2 illustrates schematically the details of driver 90 for controlling the supply of current to each winding of stepping motor 80. That stepping motor is preferably a five phase motor and, thus, driver 90 includes separate stages A-E for individually controlling the current through each winding. While only a five phase stepping motor is described in detail below, the present invention specifically contemplates use with stepping motors having a different number of phases.

Driver 90 also includes control signal input 200 having individual input lines 202, 204, 206, 208 and 210 corresponding to control signals received through D/A 95 from computer 100 for phases 1-5, respectively, of stepping motor 80. Input line 202 provides signals to stage A through resistor 212A. Stage A includes power operational amplifier 214A whose negative input terminal is connected to input line 202. The positive input terminal and the output of amplifier 214A, the latter through a compensation network containing resistor 216A and capacitor 218A in series, is connected to ground or signal drain 220A. The output of amplifier 214A is also connected to control signal output 230 along line 232. The control signal from line 232 is input to the phase 1 control winding of stepping motor 80. The return current line from that phase 1 control winding is connected to return line 242 and, through resistor 222A, to ground. Return line 242 is also connected to line 224A and, through resistor 222A to complete the feedback loop of amplifier 214A.

Although driver 90 has been described above only with respect to single stage A, it will now be readily understood by those skilled in the art that a similar arrangement is included for stages B–E. Specifically, input lines 204, 206, 208, and 210 provide signals to stages B–E through resistors 212 B–E, respectively. Likewise, the circuit components of each of stages B–E are arranged similarly such that input lines 204, 206, 208 and 210 are connected to the negative input terminal of amplifiers 214 B–E, respectively; positive input terminals and the outputs of amplifiers 214 B–E, the latter through feedback loops containing resistors 222 B–E and 224 capacitors 218 B–E in series resistors 216 B–E, are connected to grounds 220 B–E, respectively; the outputs of amplifiers 214 B–E are also connected to control signal output 230 along lines 234, 236, 238 and 240 and input to the phase 2-5 control windings, respectively, of stepping motor 80; and return lines 244, 246, 248 and 250 are connected to the negative input terminals of amplifiers 214 B–E through resistors 226 B–E and, along lines 224 B–E and through resistors 226 B–E to ground in parallel with resistors 222 B–E, to ground 220 B–E.

Depending upon the particular stepping motor and control system component characteristics, various modifications will be made in the driver 90 to meet specific stability constraints. For example, with the commercially available stepping motor described above, the negative input terminals of amplifiers 214 A-E are connected to grounds 220 A-E, respectively, through another resistor (not shown in FIG. 2).

In operation, driver 90 typically controls current flow through stepping motor 80 such that four of the windings are continuously fully energized with true DC current flowing in either the positive or negative direction up to the rating of that stepping motor. The fifth winding is considered the control winding for that phase and is controlled by slowly changing current flows from a full positive level down through zero and to a full negative level. This driver arrangement provides extremely precise control and responsiveness of the stepping motor due to the linear control of the current in each individual winding. Tests have shown that the accuracy of the drive of the present invention achieves the equivalent of at least 127,000 increments through one revolution of the stepping motor.

It is believed that this greatly improved result arises because the use of true DC current in each stepping motor winding prevents current from being introduced to the control winding from adjacent windings. Such induced currents, resulting from pulsed currents through windings of chopper driven motors, have caused stepping motors to act as transformers, with the resulting loss in control system precision. Previously, it might be expected that a driver applying such true DC current to a stepping motor would be unsuitable for control systems in machine tools since the stepping motor speed would be severely limited by such a DC current control. However, with the eccentric cam and hydraulic actuator arrangement of the present invention, high stepping motor speeds are unnecessary. Shaft 82 only needs to rotate through ±45° to fully actuate valve 20 from position 22 to position 26 and several thousand incremental steps are still provided.

Computer 100 of FIG. 1 is programmed to provide control signals which avoid control system inaccuracies and imprecisions and give significantly improved accuracy. This programming may, for example, be embodied in internal PROMs and/or input by floppy disks. Briefly, the preferred programming of the present invention includes a two part algorithm wherein large deviations between the desired system condition and the actual system condition are processed to most quickly slew the stepping motor to approximately the desired condition. Once this rough approximation is made, or where there are small deviations between the desired and actual system conditions, a second part of the algorithm processes control signals to precisely achieve the desired condition by taking into account various feedback signals received by computer 100 as well as known characteristics of the control and/or hydraulic actuating system. These characteristics include, for example, various component hystereses, response lag times, and stepping motor resolution. The feedback signals indicate, for example, the actual position and/or velocity of the movable elements actuated by the hydraulic system as well as various operating characteristics, such as variations in the load on those movable elements.

Figure 3:
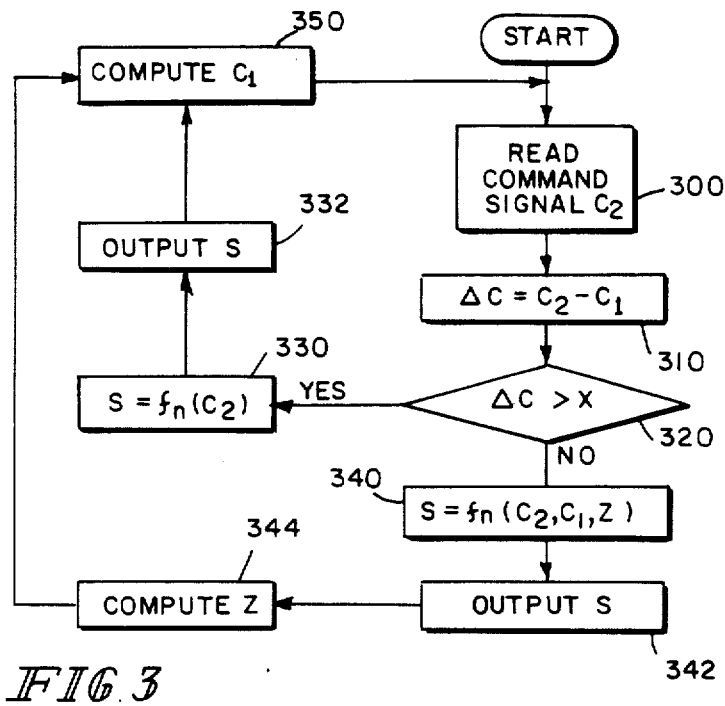
FIG. 3 shows a flow chart for control programming of the control system of FIG. 1, according to the principles of the present invention.

FIG. 3 illustrates a flow chart for a method of generating control signals which is embodied in the programming of computer 100 according to the present invention. After "start", computer 100 reads the user input command signals, according to step 300. These command signals indicate the desired condition, for example, position and/or velocity of movable elements actuated by the hydraulic system, of FIG. 1, and are designated as $C_2$. In step 310, the error or deviation between the actual condition, designated as $C_1$, and the desired condition is calculated and an error signal, designated as $\Delta C$, is produced. In step 320, $\Delta C$ is compared with a predetermined level, designated as X. If $\Delta C$ exceeds X, control signals to the driver and stepping motor, designated as S, are calculated according to step 330. If $\Delta C$ becomes less than X, control signals S are calculated according to step 340.

In step 330, S is calculated, for example, as a function of $C_2$. Since the deviation between $C_2$ and $C_1$ is large, it is desirable to provide control signals which will achieve a rough approximation of the desired condition as quickly as possible. As long as $\Delta C$ is large, feedback signals and system characteristics are ignored in calculating S. Once this S is obtained, it is output through the control system according to step 332. In step 350, the effect of these control signals is determined in that a new $C_1$ is computed from feedback signals and the control program cycle continues again with step 300.

In calculations of S according to step 340, S is, for example, a function of $C_1$, $C_2$ and z, where z designates feedback signals and system characteristics. Since deviation between $C_2$ and $C_1$ is small, it is desirable to provide control signals which precisely achieve the desired condition. Typically, an initial control signal level is calculated from the feedback signals to make $\Delta C$ equal to zero and then that initial signal is modified in order to compensate for system characteristics. Once S is obtained, it is output through the control system according to step 342. Since $\Delta C$ is small, in steps 344 and 350 the effect of these control signals is determined in that new z and $C_1$ values are computed, respectively, and the control program cycle continues again with step 300.

Such a two part program permits the control system to slew to the desired condition relatively quickly without gradually slowing down until the deviation falls below a predetermined X value. Where, for example, $C_2$ represents a desired velocity, S calculated according to step 330 is the same value for every program cycle until $\Delta C$ is less than X. Thus, the system response time is made as fast as possible during the rough approximation.

Without then calculating S according to step 340 the imprecisions and instabilities of prior control systems are not avoided. By taking component hystereses and lag time into account, the control system may make a larger correction than required to achieve the desired condition (overshooting) and then back off. Thus, the digital control system response of the present invention more closely resembles the actual response of the hydraulic actuating system than prior analogue control systems wherein control signals gradually decrease $\Delta C$ along a continuous curve. The program of the present invention has been found to significantly reduce oscillation of control signals about the desired condition.

System characteristics may be programmed into computer 100 or the program may be self-training during, for example, power-up of the machine tool. Some characteristics, such as operating load may be monitored and feedback signals provided to the computer. Complete customization and compensation for non-linear displacement response of hydraulic actuating system components is provided by the control program of the present invention. Also, certain maximum and minimum operating values which are precisely determined can be programmed into the computer so that control signals are generated which immediately achieve that condition when desired.

Figure 4:
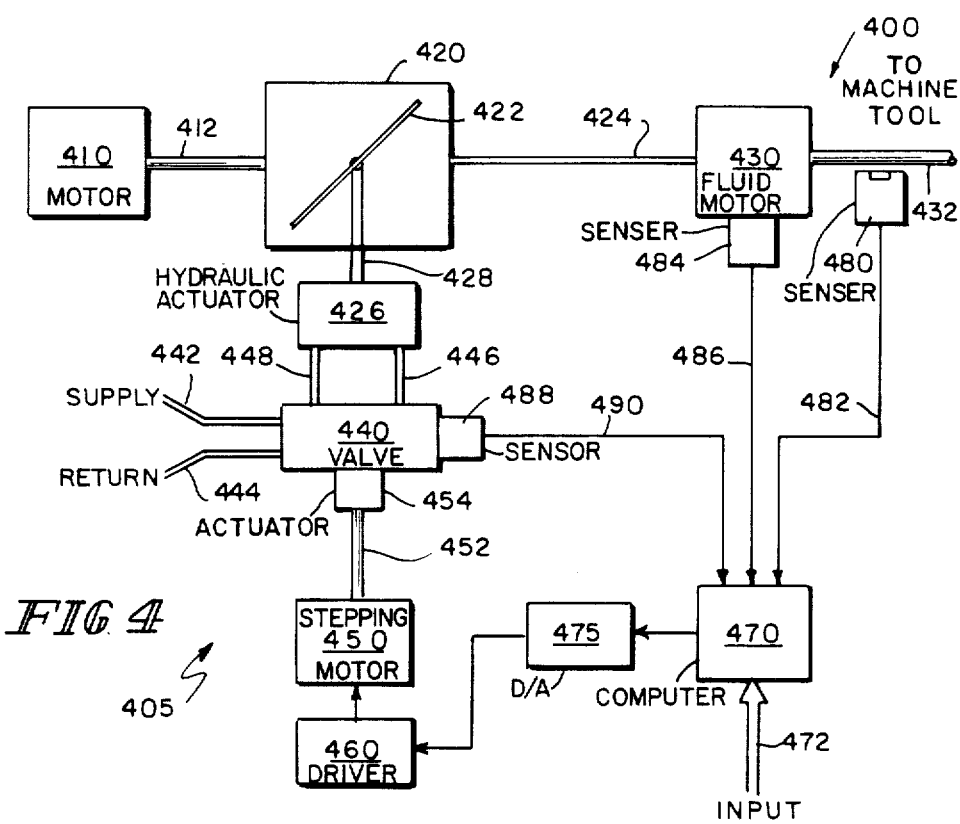
FIG. 4 shows, in block diagram form, another control system and hydraulic actuating system embodying the principles of the present invention.

The control system and computer program therefor of the present invention has been found to be especially suitable for use in hydrostatic transmission systems. FIG. 4 illustrated hydrostatic transmission system 400 embodying the principles of the present invention which is, for example, used to provide a constant rotational velocity for a machine tool spindle (not shown). Constant speed electric motor 410 provides rotational power along output shaft 412 to drive variable displacement pump (VDP) 420. The fluid output of VDP 420 is thus determined by the displacement of internal swash plate 422. Hydraulic actuator 426 controls the displacement of swash plate 42 through actuator linkage 428. The output of VDP 420 is provided to fluid motor 430 along line 424. Fluid motor 430 provides rotational power along output shaft 432 to, for example, a rotatable machine tool spindle (not shown).

It is often desirable that the rotational speed of that machine tool remain constant despite variations in operating conditions, such as load and temperature, and that changes in the rotational speed be accomplished immediately. To achieve these goals, the control system of the present invention includes hydraulic valve 440 for controlling hydraulic pressure flow between supply line 442 and return line 444 and control lines 446 and 448. These latter control lines are connected to hydraulic actuator 426 and serve to supply the hydraulic pressure to and from that actuator which causes displacement of swash plate 422.

Valve 440 is precisely actuated by multi-phase stepping motor 450 which, as in the embodiment of FIG. 1, provides rotational force along output shaft 452 to actuator arrangement 454 which controls operation of valve 440. This actuator arrangement is, for example, similar to the eccentric cam-plunger arrangement described above with regard to FIG. 1. The rotation of output shaft 452 and the resolution of stepping motor 450 is controlled by driver 460 which receives control signals from computer 470 through D/A 475.

Computer 470 receives command signals indicative of the desired rotational speed of the machine tool from the user along input 472. In addition, detectors 480, 484 and 488 monitor the actual rotational speed of the machine tool indirectly through the rotation of output shaft 432, the hydraulic pressure within fluid motor 430 (which indicates, for example, load conditions on the machine tool spindle), and the null position of valve 440, respectively. Detectors 480, 484 and 488 provide feedback signals along lines 482, 486, and 490, respectively, to computer 470. Depending upon the level of precision necessary, in particular embodiments of the present invention not all of these detectors will be necessary. The components and operation of control system are similar to that described above with regard to FIGS. 1, 2, and 3.

To avoid the instabilities and unresponsiveness of prior control systems for hydrostatic transmissions, the present invention accounts for the hysteresis and deadband in displacement of swash plate 422 as well as varying load conditions applied to fluid motor 430 through the machine tool spindle which will result in a decrease in the motor output speed. The stroke of VDP 420 is increased to compensate for this decrease. Typically it is desirable to provide immediate compensation for even very small deviations. The control system of the present invention provides limited modulation of swash plate 422 about the desired position in order to compensate for its hysteresis and deadband and to accurately position the swash plate over small increments.

Figure 5:
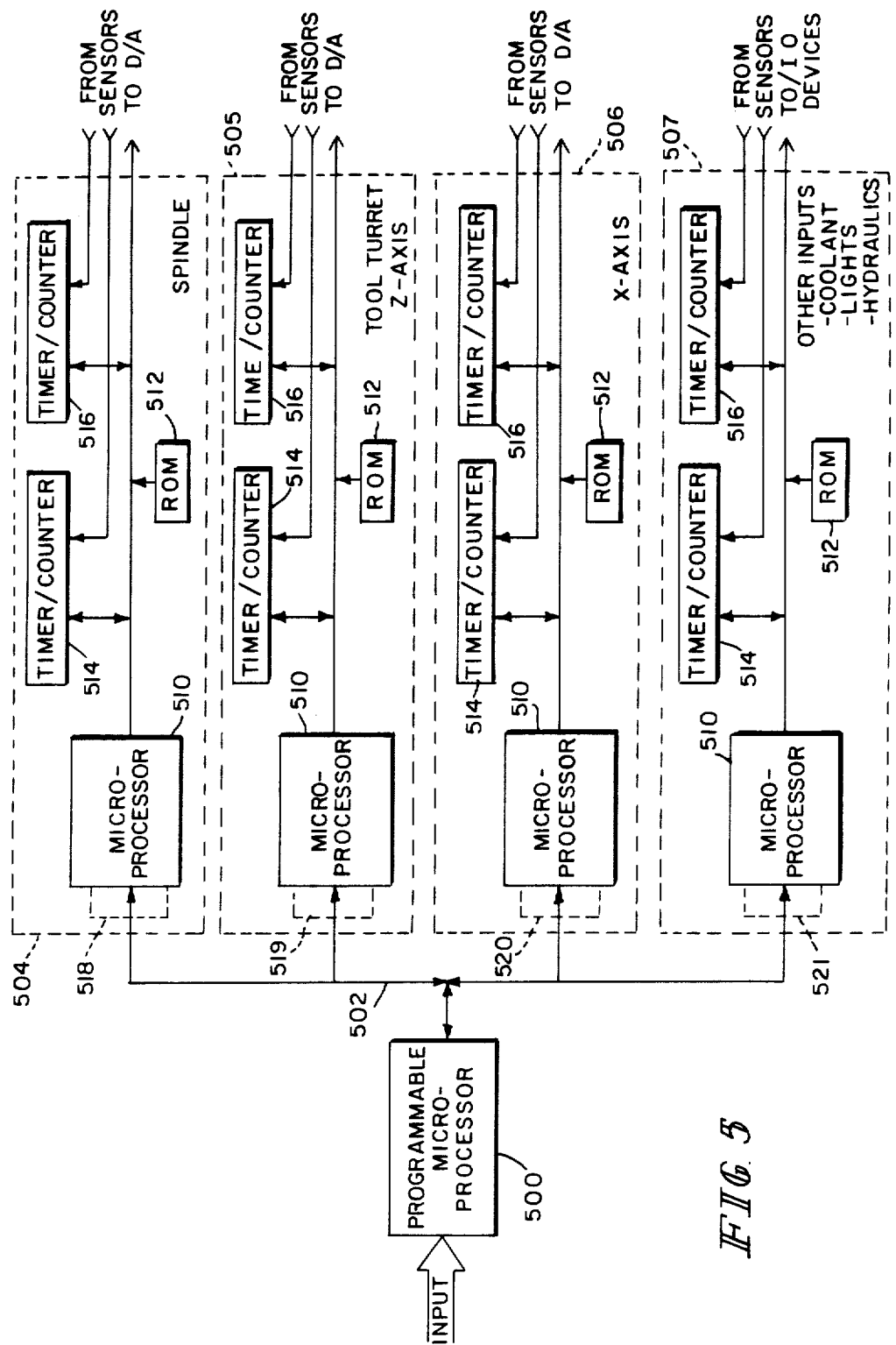
FIG. 5 shows a block diagram of a preferred embodiment of the computer control circuitry of the present invention.

FIG. 5 shows a preferred embodiment of computers 100 and 470 discussed above. The arrangement of FIG. 5 includes a programmable "master" microprocessor 500 connected by a data transmission link 502 to a plurality of control circuits 504 through 507. Programmable microprocessor 500 receives input command signals from the user which are indicative of the desired operating states of the various machine functions and components. Processor 500 then generates appropriate command signals for communication to control circuits 504 through 507, via data transmission link 502.

It is to be understood that programmable microprocessor 500 may include separate communications processors or computers for receiving input commands from the user and/or for communicating command signals to the various control circuits.

Data transmission link 502 is preferably a single data transmission line connecting programmable microprocessor 500 with each of the control circuits 504 through 507. Command signals are transmitted via data link 502 to each of the individual control circuits, and status information relating to the operating states of the various machine functions is transmitted by data link 502 to programmable microprocessor 500 or to an external communications computer, as desired.

In the preferred arrangement shown in FIG. 5, control circuit 504 controls the spindle of a lathe, control circuit 505 controls rotary indexing of the tool turret and motion along the axis (i.e., the long axis) of the lathe, control circuit 506 controls the x-axis (i.e. the axis perpendicular to the z-axis), and control circuit 507 controls all other functions, such as coolant flow, lights, hydraulic pumps, etc.

Control circuits 504 through 507 receive command signals from data link 502 and external feedback signals from sensors associated with the respective machine functions to be controlled. Control circuits 504 through 507 output control signals to a D/A converter (95 in FIG. 1) which, in turn, outputs control signals to a driver (90 in FIG. 1). The driver precisely controls the positioning of a stepping motor shaft by maintaining full rated current in all but one phase of the motor, and by slowly varying the current level in the remaining phase, to precisely control the angular displacement of the shaft. If a five-phase stepping motor, as discussed above, is used in combination with an eight-bit D/A converter, more than 127,000 increments of angular displacement per revolution can be achieved. The stepping motor shaft is connected by linkage to a movable element, such as a valve, in a hydraulic system which controls operation of the various machine functions.

In the preferred embodiment of FIG. 5, control circuits 504 through 507 are constructed of substantially identical components which include a microprocessor 510, a read-only-memory device (ROM) 512, and timer/counter devices 514 and 516. Microprocessor 510, which preferably is a device which is not programmable by the user, receives command signals from data link 502 and information indicative of the operational state of the machine tool functions from timer/counter devices 514 and 516. These data are processed by microprocessor 510 in accordance with instructions stored in ROM 512. For example, control circuit 504 is used to control the spindle of a lathe. Signals indicative of the respective displacements of the hydraulic pump and hydraulic motor which control the spindle are received by timer/counter devices 514 and 516 of circuit 504, respectively. Microprocessor 510 compares this information with information respresentive of the desired spindle operating state, in accordance with an instruction set stored in a specified portion of ROM 512. Appropriate control signals are generated and provided to the D/A converter to cause the spindle to move to the desired operating condition. Microprocessor 510 is also capable of relaying status information to programmable microprocessor 500 for external display and/or processing.

The primary components of the control circuits (i.e., microprocessor 510, ROM 512, and timer/counter devices 514 and 516) are identical components and are interchangeable among the various control circuits. All "slave" microprocessors 510 are connected to processor 500 by the single data link 502. Although the slave processors are identical, they can be made to selectively respond to command signals from processor 500. This is preferably accomplished by providing decoders 518–521 in combination with the connectors which receive the slave processors. In operation, the master processor produces a coded signal which is recognized by the decoder associated with the appropriate control circuit. The respective slave processor is then activated to receive the subsequent command signals. Each ROM 512 contains all of the instruction sets for controlling all of the respective machine functions. When ROM 512 is placed in control circuit 504, a specific portion or segment of the memory is accessed by the microprocessor associated with this circuit. This memory segment contains the instruction set for controlling the lathe spindle. When ROM 512 is placed in control circuits 505–507, a different segment of memory, and a different instruction set, is accessed.

Access to or selection of a specific instruction set may be accomplished by means of coded command signals from the master processor or by selectively connecting to particular input and output terminals of ROM 512 when the device is placed in the particular control circuit designated for controlling a particular machine function. Alternatively, all input and output terminals of the ROM may be connected, while only selected terminals of microprocessor 510 are connected, depending upon the machine function to be controlled. The primary concern is to provide for simplicity and reliability of the machine control system, and for interchangeability of the major components of the control circuits.

Timer/counter devices 514 and 516 may be pulse counting devices which count a stream of pulses produced by the sensing device or, alternatively, timers which generate pulses at a known rate in response to an initiating signal. Devices 514 and 516 are up/down timer/counter devices capable of indicating a change in direction of the associated machine function.

Although the present invention has been described and illustrated in detail, it is to be clearly understood that the same is by way of illustration and example only, and is not to be taken by way of limitation. The spirit and scope of the present invention are to be limited only by the terms of the appended claims.

We claim:

1. Apparatus for controlling a plurality of machine tool functions, via a hydraulic system, comprising:
    a plurality of electric drive means for activating respective movable elements in said hydraulic system to control said machine tool functions;
    microprocessor means for receiving input commands from an external source and for generating command signals;
    data transmission means, connected to said microprocessor means, for receiving and transmitting command signals;
    sensor means for generating feedback signals indicative of an operating state of respective machine tool functions; and
    a plurality of control circuit means, connected between said data transmission means and said electric drive means, for controlling said drive means in response to said command signals and said feedback signals;
    wherein, each of said control circuit means includes means for receiving said feedback and command signals,
    memory means for storing a plurality of instruction sets, each of said instruction sets corresponding to a respective one of said plurality of machine tool functions;

means for selecting one of said plurality of instruction sets for use in controlling a corresponding machine tool function;

processing means for processing said feedback signals in accordance with said selected instruction set and for producing control signals;

means for producing drive signals in response to said control signals; and means for selectively activating said processing means to control a selected one of said machine tool functions.

2. Apparatus according to claim 1, wherein said processing means, said memory means and said means for receiving external feedback signals for each of said plurality of control circuit means are substantially identical and are interchangeable among said plurality of control circuit means.

3. Apparatus according to claim 2, wherein said processing means is a non-programmable microprocessor.

4. Apparatus according to claim 2, wherein said memory means is a read-only-memory.

5. Apparatus according to claim 2, wherein said means for receiving external feedback signals includes a pulse counting or timing device.

6. Apparatus according to claim 1, wherein said means for selectively activating said processing means includes decoder means responsive to coded command signals produced by said microprocessor means.

7. Apparatus according to claim 1, wherein said means for producing drive signals includes a D/A converter for receiving digital control signals from said processing means and for producing analog control signals, and a drive circuit for receiving said analog control signals and for producing drive signals for said drive means.

8. Apparatus for controlling a plurality of electric drive mechanisms, comprising:

microprocessor means for receiving input commands from an external source and for generating command signals;

sensor means for generating feedback signals indicative of an operating state of said electric drive mechanisms;

a plurality of control circuit means, connected to respective ones of said electric drive mechanisms, for controlling said drive mechanisms in response to said command signals and said feedback signals; and means for communicating said command signals and feedback signals to said control circuits;

wherein, each of said control circuit means includes means for receiving said feedback and command signals, memory means for storing a plurality of instruction sets, each of said instruction sets corresponding to a respective one of said plurality of electric drive mechanisms;

means for selecting one of said plurality of instruction sets for use in controlling a corresponding electric drive mechanism;

processing means for processing said feedback signals in accordance with said selected instruction sets and for producing control signals;

means for producing drive signals for said electric drive mechanisms in response to said control signals; and means for selectively activating said processing means to control a selected one of said plurality of electric drive mechanisms.

9. Apparatus according to claim 8, wherein said means for communicating command and feedback signals to said control circuits comprises a single data transmission link connecting said microprocessor means and said control circuit means.

10. Apparatus according to claim 8, wherein said means for selectively activating said processing means includes decoder means for receiving and decoding a coded command signal from said microprocessor.

11. Apparatus according to claim 8, wherein said means for producing drive signals includes a D/A converter for receiving digital control signals from said processing means and for producing analog control signals, and a drive circuit for receiving said analog control signals and for producing drive signals for said electric drive mechanism.

12. Apparatus according to claim 11, wherein said means for selectively activating said processing means includes decoder means for receiving and decoding a coded command signal from said microprocessor.

* * * * *